United States Patent
Brunken, Jr.

(10) Patent No.: US 6,425,568 B1
(45) Date of Patent: Jul. 30, 2002

(54) SUPPORT ASSEMBLY FOR A ROTATING SHAFT

(75) Inventor: John Elton Brunken, Jr., Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 09/477,969

(22) Filed: Jan. 5, 2000

Related U.S. Application Data

(62) Division of application No. 09/053,480, filed on Apr. 1, 1998, now Pat. No. 6,057,618.

(51) Int. Cl.$^7$ ............................................. F16M 13/00
(52) U.S. Cl. ...................................... 248/562; 248/637
(58) Field of Search ................................ 248/560, 562, 248/568, 570, 638, 676, 637

(56) References Cited

U.S. PATENT DOCUMENTS

| | | | | |
|---|---|---|---|---|
| 2,725,266 A | * | 11/1955 | Mendelsohn | 310/90.5 |
| 3,811,740 A | * | 5/1974 | Sacendoti et al. | 308/10 |
| 4,145,626 A | * | 3/1979 | Aroshidze et al | 310/91 |
| 4,202,551 A | * | 5/1980 | Darnall, Jr. | 369/263 |
| 4,278,726 A | * | 7/1981 | Wieme | 248/560 X |
| 4,406,642 A | * | 9/1983 | McNall | 464/180 |
| 4,442,367 A | * | 4/1984 | Suzuki | 310/91 |
| 4,506,857 A | * | 3/1985 | Hara et al. | 248/655 |
| 4,726,112 A | * | 2/1988 | King et al. | 29/596 |
| 4,978,581 A | * | 12/1990 | Fukahori et al. | 428/429 |
| 5,177,387 A | * | 1/1993 | McMichael et al. | 310/90.5 |
| 5,495,221 A | * | 2/1996 | Post | 335/299 |
| 5,506,459 A | * | 4/1996 | Ritts | 310/90.5 |
| 5,521,447 A | * | 5/1996 | Bertolini et al. | 310/51 |
| 5,521,448 A | * | 5/1996 | Tecza et al. | 310/90.5 |
| 5,847,476 A | * | 12/1998 | Elsing et al. | 310/51 |
| 5,847,480 A | * | 12/1998 | Post | 310/90.5 |
| 6,126,136 A | * | 10/2000 | Yen et al. | 248/560 |

* cited by examiner

Primary Examiner—Ramon O. Ramirez
(74) Attorney, Agent, or Firm—Sanford E. Warren, Jr.; Kenneth T. Emanuelson; Gardere Wynne Sewell LLP

(57) ABSTRACT

A support assembly for supporting a rotating shaft relative to a structure in which a first magnetized member is attached to the shaft for rotation therewith, a support member is connected to the structure and at least one damper member connects the support member to a second magnetized member for supporting the second magnetized member in a portion relative to the first magnetized member. The respective magnetic fields of the first and second magnetized members are such that radial deflective movement of the shaft, and therefore the first magnetic member, causes corresponding radial movement of the second magnetized member which is dampened by the damping member.

16 Claims, 3 Drawing Sheets

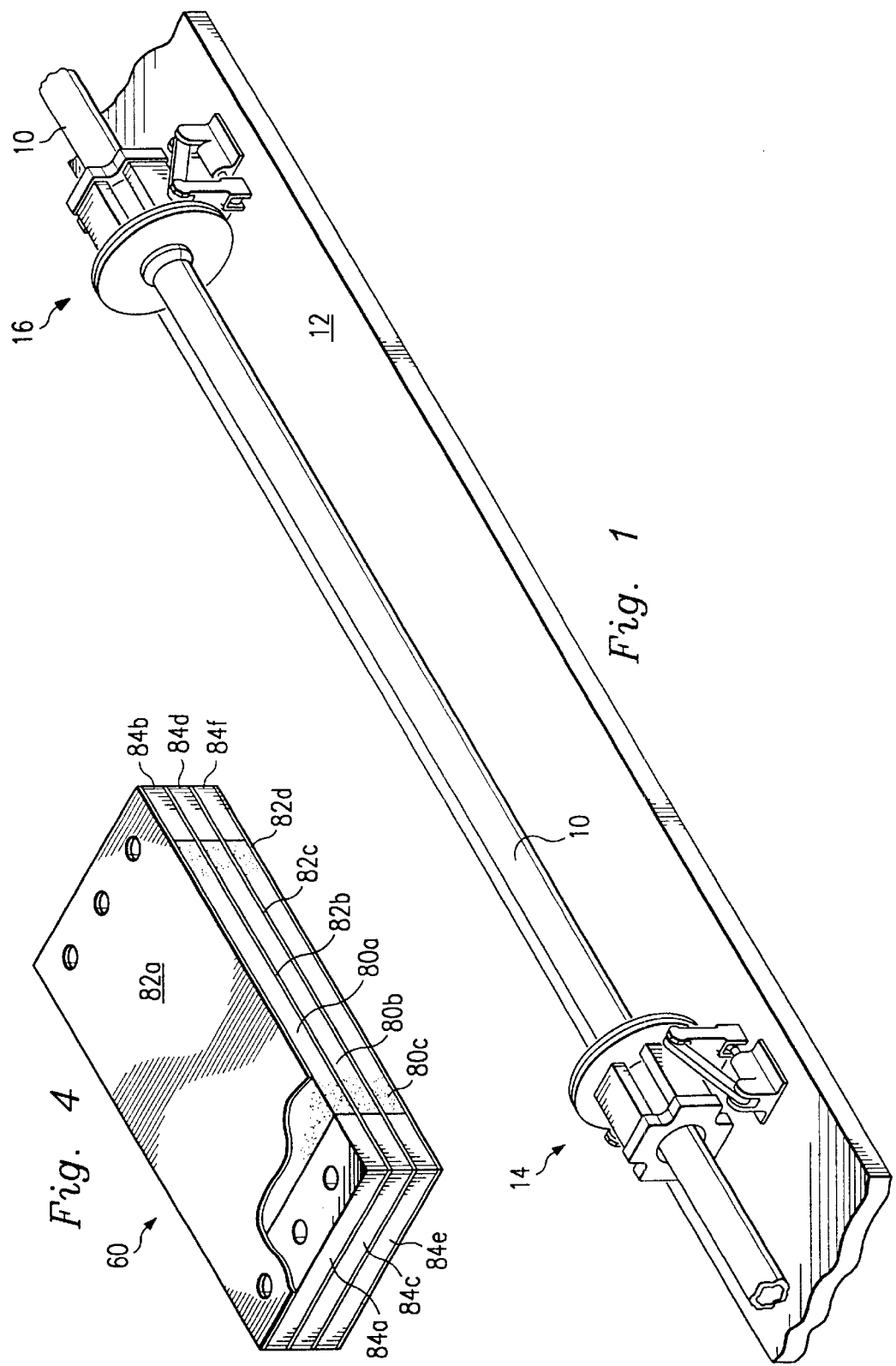

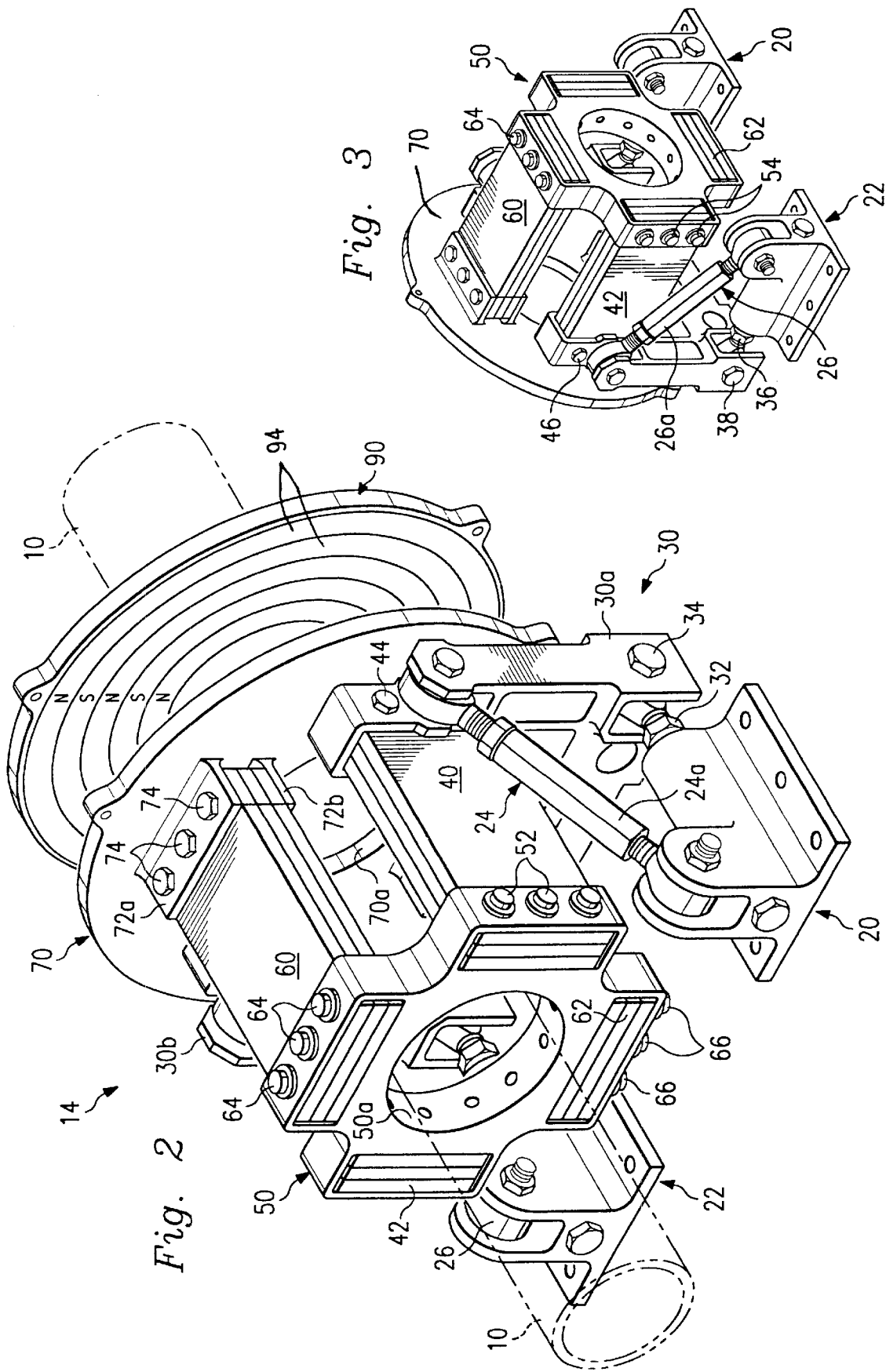

SUPPORT ASSEMBLY FOR A ROTATING SHAFT

This application is a division of application Ser. No. 09/053,480 filed on Apr. 1, 1998, now U.S. Pat. No. 6,057,618.

BACKGROUND OF THE INVENTION

This invention relates to an assembly for supporting a shaft and, more particularly, to a non-contacting support assembly for supporting a relatively long, rotating shaft without the use of grease lubricated bearings and associated apparatus.

There are several applications in which a relative long shaft must be supported for relative high-speed rotational movement. For example, the tail rotor drive shaft of a helicopter, or an interconnecting drive shaft of a tilt rotor aircraft must be supported in a manner to prevent misalignment of the shaft yet permit rotation of the shaft at relatively high supercritical speeds. Most systems for supporting these types of shafts employ a plurality of grease lubricated bearings and hanger brackets which are expensive, heavy and cumbersome and require heavy maintenance. Also, to accommodate angular misalignment, expensive and heavy couplings are required. Further, subcritical shafts have to be relatively stiff so that they can rotate at speeds below their resonant frequencies to prevent instability.

Additional problems arise when the shaft rotates at supercritical speeds since a damping element and/or a motion limiter, such as a squeeze film damper or a friction damper, is usually required. However, these devices must be made to precision tolerances, and require accurate shaft alignment and regular inspections and maintenance, all of which are expensive.

Therefore, what is needed is a relative inexpensive and lightweight support assembly for supporting a rotating shaft according to which the shaft does not contact the support structure or dampers and therefore does not require grease lubricated bearings, hangers and the like, while eliminating squeeze film dampers and friction dampers. Also, a support assembly of the above type is needed which requires relatively little maintenance yet enables the shaft to rotate at supercritical speeds while maintaining shaft stability and maintaining the shaft alignment to the desired shape and position.

SUMMARY OF THE INVENTION

Accordingly, the support assembly of the present invention is adapted to support a rotating shaft relative to a structure and includes a first magnetized member attached to the shaft for rotation therewith. A support member is connected to the structure and to a second magnetized member for supporting the second magnetized member in a position relative to the first magnetized member. The respective magnetic fields of the first and second magnetized members are such that radial deflective movement of the shaft, and therefore the first magnetic member, causes a radial force to be transmitted to the second magnetized member. The radial force causes radial movement of the second magnetized member which is dampened by the support member. The equal and opposite radial forces on the first magnetized member tends to maintain the shaft's radial location and thus keep it aligned.

BRIEF DESCRIPTION OF THE DRAWINGS

FIG. 1 is an isometric view of two support assemblies of the present invention show supporting the center section of an elongated rotating shaft FIG. 2 is an enlarged isometric view of the support assembly of FIG. 1.

FIG. 3 is an isometric view similar to that of FIG. 2 but depicting the support assembly of FIG. 2 viewed from an opposite side and in a reduced scale.

FIG. 4 is a perspective view of a component of the support assembly of FIGS. 1–3.

DESCRIPTION OF THE PREFERRED EMBODIMENTS

Figure 5:
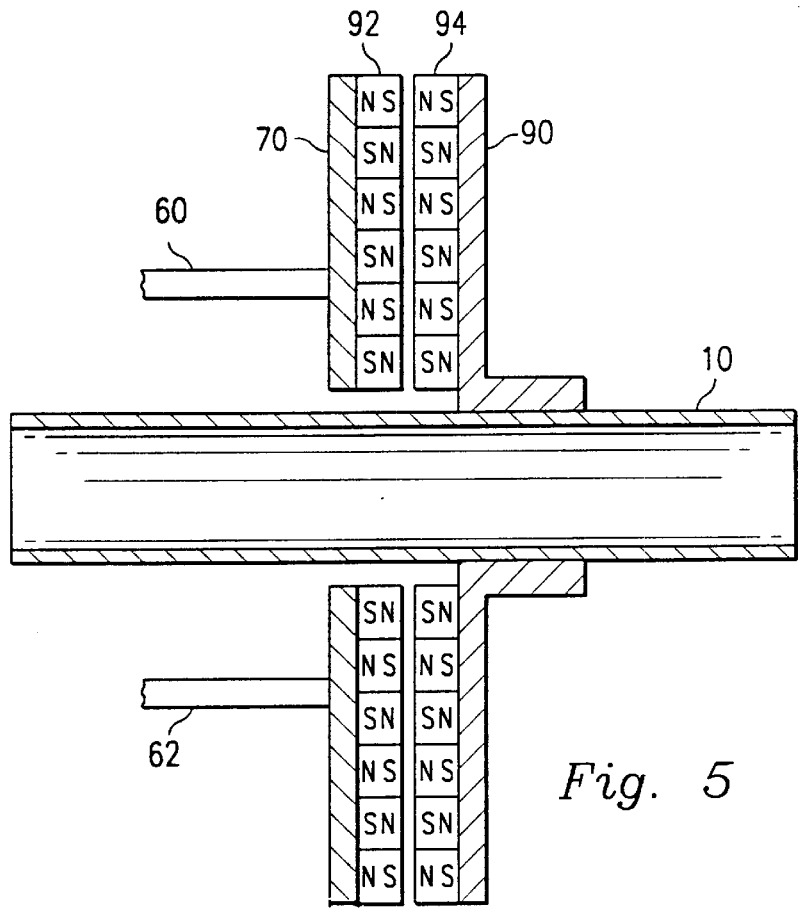
FIGS. 5 and 6 are schematic views depicting operational principles of the support assembly of FIGS. 1–3.

Referring to FIG. 1 of the drawings, the reference numeral 10 refers to a shaft which is supported for rotation relative to a support member, or plate, 12. For the purpose of example it is assumed that the shaft 10 is the tail rotor drive shaft of a helicopter or the interconnecting drive shaft of a tilt rotor aircraft, and the plate 12 is a structural support member of the helicoptor or aircraft. Two support assemblies employing features of the present invention are shown, in general, by the reference numerals 14 and 16 and are adapted to support the shaft 10 in a slightly elevated position relative to the plate 12.

The support assembly 14 is shown in detail in FIGS. 2 and 3 and includes two spaced brackets 20 and 22 that are bolted to the plate 12. A pair of turnbuckles 24 and 26, of a conventional design, connect the brackets 20 and 22, respectively, to a bracket 30. The bracket 30 is generally U-shaped and has two spaced parallel legs 30a and 30b that extend vertically as viewed in FIG. 2. The respective ends of the turnbuckle 24 are mounted for pivotal movement relative to the bracket 20 and the leg 30a of the bracket 30, and the respective ends of the turnbuckle 26 are mounted for pivotal movement relative to the bracket 22 and the leg 30b of the bracket 20, all in a conventional manner. The turnbuckles 24 and 26 include outer sleeves 24a and 26a, respectively, which, when manually rotated, axially expand or contract the turnbuckles, also in a conventional manner and for reasons to be described.

An expansion bolt 32 is in threaded engagement with a threaded bore (not shown) provided in the bracket 20 and has a head portion connected to the bracket 30 by a bolt 34 extending through aligned openings in the bracket 40 and through an opening in the head portion. An expansion bolt 36 is in threaded engagement with a threaded bore (not shown) provided in the bracket 22 and has a head portion connected to the bracket 30 by a bolt 38 extending through aligned openings in the bracket 30 and through an opening in the latter head portion. The expansion bolts 32 and 36 can be axially expanded and contracted by rotating the bolts in a conventional manner. As a result of the foregoing, expansion and contraction of the expansion bolts 32 and 36 and the turnbuckles 24 and 26, adjust the position of the bracket 30 in an axial direction relative to the shaft 10, as well as its angular position relative to a vertical and horizontal axis as viewed in FIGS. 2 and 3, for reasons to be described.

Two horizontally-spaced, parallel damping members 40 and 42 are mounted at one of their ends to the bracket 30 by a plurality of bolts 44 and 46, respectively. The damping members 40 and 42 are rectangular in cross section and extend upright and horizontally as viewed in FIGS. 2 and 3. A bracket 50 is provided in a spaced relation to the bracket 30 and is connected to the other ends of the damping members 40 and 42 by a plurality of bolts 52 and 54, respectively. The bracket 50 has a central opening 50a for receiving the shaft with ample clearance.

Two vertically-spaced, parallel damping members 60 and 62 are mounted at one end to the bracket 50 by a plurality of bolts 64 and 66, respectively. The damping members 60 and 62 are rectangular in cross section and extend horizontally as viewed in FIGS. 2 and 3. The damping members 40, 42, 60 and 62 are angular spaced at ninety degree intervals.

A substantially disc-shaped, metal casing 70 is connected to the other end of the damping member 60 by a pair of spaced mounting plates 72a and 72b affixed to one face of the casing, and by three bolts 74 that extend though aligned holes in the mounting plates and the damping member. Although not shown in the drawings it is understood that the other end of the damping member 62 is connected to the casing 70 by a pair of spaced mounting plates and bolts which are identical to the mounting plates 72a and 72b and the bolts 74, respectively. The casing 70 has a central opening 70a that receives the shaft 10 with ample clearance.

With reference to FIG. 4, the damping member 60 is formed by three stacked elastomeric damping pads 80a–80c. The pad 80a is sandwiched between two relatively thin, plates 82a and 82b, the pad 80b is sandwiched between the plate 82b and an additional plate 82c, and the pad 80c is sandwiched the plate 82c and an additional plate 82d. The plates 82a–82f extend beyond the ends of the pads 80a–80c, and six blocks 84a–84f of a strong rigid material, such as aluminum, are disposed at the respective ends of the pads and between the respective plates.

To assemble the damping member 60, the plates 82a–82d and the blocks 84a–84f are assembled as shown in FIG. 4 and the elastomer pads 80a–80c are molded or bonded in the cavities formed by the plates and the blocks to form a unitary member. The plates 82a–82d and the blocks 84a–84f each have openings therethrough so as to receive the bolts 64 and 74 (FIGS. 2 and 3) and thus permit a rigid mounting of the damping member 60 to the bracket 50 and to the plates 72a and 72b. It is understood that the damping members 40, 42 and 62 are identical to the damping member 60 and thus will not be described in detail. The use of two damping members 40 and 42, as well as two damping members 60 and 62, allows radial movement of the casing 70 without causing any tilting, or angular movement, of the casing.

Referring again to FIGS. 2 and 3, a metal, disc-shaped casing 90 is provided that is identical to the casing 70 with the exception that the casing 90 is connected to the shaft. In this context the casing 90 has a central opening (not shown) that receives the shaft 10 with minimal clearance and the casing is connected to the shaft in any conventional manner such as providing an axial flange, or the like, on the casing for securing to the shaft. The casing 90 thus rotates with the shaft 10 during its operation.

The support assembly 14 is installed relative to the support plate 12 (FIG. 1) and to the shaft 10 so that the casing 70 is in a closely-spaced, parallel relationship with the casing 90 so as to inhibit deflective movement of the shaft in a manner to be described.

Figure 6:
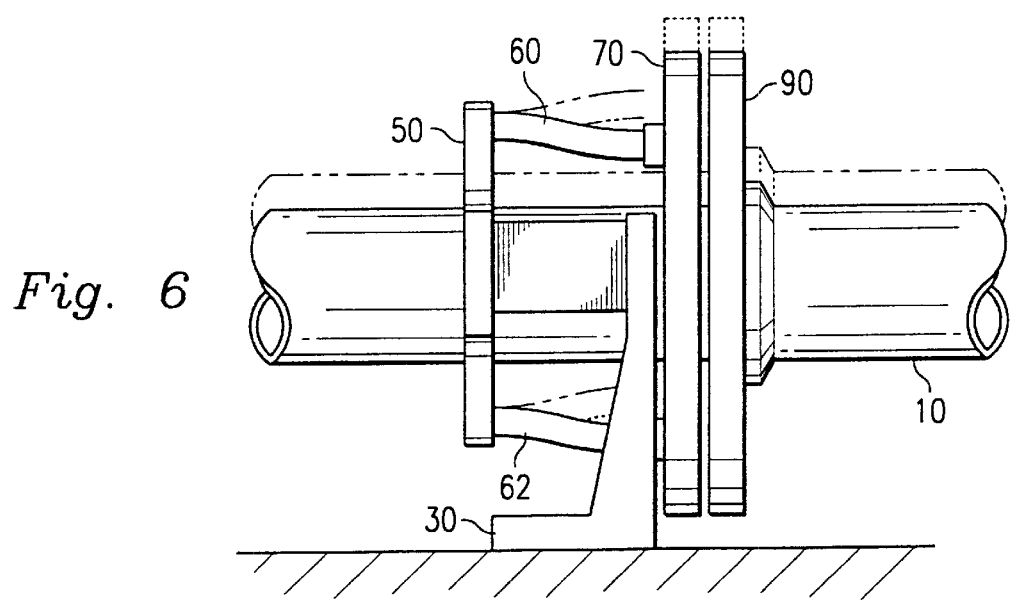

As shown in FIGS. 5 and 6, the back side of the fixed casing 70 and the front facing side of the rotating casing 90 each contain a plurality of radially spaced magnetic rings 92 and 94, respectively. The rings 92 in the casing 70 are arranged with their poles in an alternating orientation, the rings 94 in the casing 90 are arranged in an alternating orientation, and the rings 92 are arranged relative to the rings 94 so that the facing poles of the respective rings are opposite in polarity. Since the rings 92 will thus be attracted to the rings 94 in an axial direction, the support assembly 14 is positioned relative to the casing 90 a distance to maintain a magnetic attraction between the rings 92 of the casing 70 and the rings 94 of the casing 90, thus creating an axial force that is reacted at one end of the shaft 10. In this manner, the alternating poles of the respective rings 92 and 94 center the casing 70 relative to the casing 90 and provide a strong resistance to any relative radial motion between the casings. Thus, any radial deflective movement of the shaft 10 will be resisted by the magnetic force between the rings 92 and 94

As a result of the above, the support assembly 14 provides a non-contacting, support of the shaft in an elevated position relative to the support plate 12 (FIG. 1), while the magnetic rings 92 and 94 create a spring-like resistance to radial motion of the shaft. This latter effect allows radial forces to be carried from the rotating shaft 10 and the rotating casing 90 to the support assembly 14 which acts as a damper and a restoring spring to radial displacement of the shaft, without any impedance to rotation of the shaft. The magnetic force between the rings 92 and 94 also acts to oppose radial movement of the shaft and thus tender to maintain shaft alignment.

Since the support assembly 16 is identical to the support assembly 14 the assembly 16 will not be described in detail.

In operation, the shaft 10 is positioned in the elevated position relative to the support plate 12 as shown in FIG. 1, and the support assembly 14 is positioned with its casing 70 and the magnetic rings 92 in a closely spaced relationship with the casing 90 and its magnetic rings 94. The turnbuckles 24 and 26 (FIGS. 2 and 3), together with the screws 32 and 36, are adjusted so that the casing 70 extends in a parallel, aligned relation with the casing 90 in an axial direction relative to the shaft 10. This adjustment of the turnbuckles 24 and 26 and the screws 32 and 36 also control the space between the casing 70 and the casing 90 so as to maintain a magnetic attraction between the casing and the casing yet insure that they do not touch.

The support assembly 14 thus provides a non-contacting, substantially frictionless, bearing for rotation of the shaft 10. Also, any radial deflection of the shaft 10 causes corresponding movement of the casing 90, and therefore the casing 70, due to the magnetic attraction between the rings 92 and 94. This movement of the casing 70 will be opposed by the damping and/or springlike resistance to this movement provided by the damping members 40, 42, 60 and 62. For example, any deflections of the shaft 10 that causes vertical movement of the shaft to the position shown by the phantom lines in FIG. 6 for example, will cause corresponding movement of the casing 90 and therefore the casing 70 to the positions also shown by the phantom lines. This causes resultant shear forces to be applied to the damper members 60 and 62 and cause them to move from the positions shown by the solid lines to the positions shown by the phantom lines which dampens the deflective movement of the shaft.

Although not shown in the drawings, any deflections of the shaft 10 that causes movement of the casing 90, and therefore the casing 70, in a horizontal direction, e.g. Into or from the plane of the drawing with reference to FIG. 6, will cause corresponding shear forces to be applied to the damper members 40 and 42 and cause them to deflect in the same manner as discussed above in connection with the damper members 60 and 62. Of course, deflections of the shaft 10 in a direction having both a horizontal and a vertical component will cause corresponding movement of all of the damper members 40, 42, 60 and 62 in the manners discussed above.

It is understood that the support assembly 16 functions in a manner identical to that of the support assembly 14 and that, when the shaft 10 is of a considerable length, additional support assemblies can be utilized as needed. Also, in situations in which a portion or portions of the shaft 10 must be curved by design due to its particular application, the support assemblies 14 and 16, and any additional identical support assemblies, can easily be positioned relative to the shaft to deflect the shaft into the desired curvature, thereby avoiding the need for angular misalignment couplings.

It is apparent from the foregoing that the support assembly of the present invention provides significant advantages. For example, it supports the rotating shaft in a frictionless manner and therefore does not require grease lubricated bearings, hangers and the like, while eliminating squeeze film dampers and friction dampers. Also, it is relative inexpensive and lightweight. Further, it requires relatively little maintenance yet permits the shaft to rotate at supercritical speeds while maintaining shaft stability. Still further, the ratio of damping force to spring force exerted by the damping members can be varied.

It is understood that several variations can be made in the foregoing without departing from the scope of the invention. For example, any number of support assemblies can be used at spaced intervals along the shaft to be supported with the number depending on the length of the shaft. Also, also each magnetic ring 92 and 94 can be formed by a plurality of arcuate segments which together form a circular ring. Further, the number of damping pads, and therefore the associated plates, in each of the damping members can be varied.

It is understood that other modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A damping member comprising:
   a first elastomeric member;
   first and second plate members respectively secured to opposite faces of the first elastomeric member; and
   a pair of block members disposed between the first and second plate members and on opposite ends of the first elastomeric member.

2. A damping member comprising:
   a first elastomeric member;
   first and second plate members respectively secured to opposite faces of the first elastomeric member;
   a second elastomeric member and
   a third plate member;
   the second elastomeric member being disposed in a stacked relationship between the second plate member and the third plate member.

3. The damping member as recited in claim 2 further comprising a first pair of block members disposed between the first and second plate members and on opposite ends of the first elastomeric member and a second pair of block members disposed between the second and third plate members and on opposite ends of the second elastomeric member.

4. The damping member as recited in claim 2 wherein the first elastomeric member is molded in place between the first and second plate members and the second elastomeric member is molded in place between the second and third plate members.

5. The damping member as recited in claim 2 further comprising a third elastomeric member and a fourth plate member, the third elastomeric member being disposed in a stacked relationship between the third plate member and the fourth plate member.

6. The damping member as recited in claim 5 further comprising a first pair of block members disposed between the first and second plate members and on opposite ends of the first elastomeric member, a second pair of block members disposed between the second and third plate members and on opposite ends of the second elastomeric member and a third pair of block members disposed between the third and fourth plate members and on opposite ends of the third elastomeric member.

7. The damping member as recited in claim 5 wherein the first elastomeric member is molded in place between the first and second plate members, the second elastomeric member is molded in place between the second and third plate members and the third elastomeric member is molded in place between the third and fourth plate members.

8. A method of manufacturing a damper member comprising the steps of:
   positioning first and second plate members in a spaced parallel relationship;
   disposing a pair of blocks between the first and second plate members at the corresponding ends thereof to form a first cavity therebetween; and
   molding an elastomeric material in the first cavity.

9. The method as recited in claim 8 further comprising:
   positioning a third plate member in a spaced parallel relationship with the second plate member;
   disposing a pair of blocks between the second and third plate members at the corresponding ends thereof to form a second cavity therebetween; and
   molding an elastomeric material in the second cavity.

10. The method as recited in claim 9 further comprising:
    positioning a fourth plate member in a spaced parallel relationship with the third plate member;
    disposing a pair of blocks between the third and fourth plate members at the corresponding ends thereof to form a third cavity therebetween; and
    molding an elastomeric material in the third cavity.

11. A damping member for a rotating shaft support assembly having a fixed support member, a floating support member and a casing, the rotating shaft support assembly utilizing at least one damping member between the fixed support member and the floating support member and a least one damping member between the floating support member and the casing, the damping member comprising a first elastomeric member and first and second plate members respectively secured to opposite faces of the first elastomeric member.

12. The damping member as recited in claim 11 further comprising a pair of block members disposed between the first and second plate members and on opposite ends of the first elastomeric member.

13. The damping member as recited in claim 11 further comprising a second elastomeric member and a third plate member, the second elastomeric member being disposed in a stacked relationship between the second plate member and the third plate member.

14. The damping member as recited in claim 13 further comprising a first pair of block members disposed between the first and second plate members and on opposite ends of the first elastomeric member and a second pair of block members disposed between the second and third plate members and on opposite ends of the second elastomeric member.

15. The damping member as recited in claim 13 further comprising a third elastomeric member and a fourth plate member, the third elastomeric member being disposed in a stacked relationship between the third plate member and the fourth plate member.

16. The damping member as recited in claim 14 further comprising a first pair of block members disposed between the first and second plate members and on opposite ends of the first elastomeric member, a second pair of block members disposed between the second and third plate members and on opposite ends of the second elastomeric member and a third pair of block members disposed between the third and fourth plate members and on opposite ends of the third elastomeric member.

* * * * *